United States Patent [19]

Kawazu et al.

[11] Patent Number: 5,981,652
[45] Date of Patent: Nov. 9, 1999

[54] ONE-LIQUID LOW TEMPERATURE HARDENABLE TYPE COLORED ENAMEL PAINT AND CLEAR PAINT

[75] Inventors: Kenji Kawazu, Nishikamo-gun; Hiroshi Iida; Ryuichi Asamen, both of Hirakata, all of Japan

[73] Assignees: Toyota Jidosha Kabushiki Kaisha, Aichi; Nippon Bee Chemical Co., Ltd., Osaka, both of Japan

[21] Appl. No.: 08/935,206

[22] Filed: Sep. 22, 1997

[30] Foreign Application Priority Data

Sep. 30, 1996 [JP] Japan .................................... 8-260045
Oct. 1, 1996 [JP] Japan .................................... 8-260892

[51] Int. Cl.$^6$ ................................ C08K 3/10; C08K 5/07
[52] U.S. Cl. ........................... 524/784; 525/162; 525/443
[58] Field of Search ............................. 524/784; 525/162, 525/443

[56] References Cited

U.S. PATENT DOCUMENTS 4,960,828 10/1990 Higuchi et al. .......................... 525/162

FOREIGN PATENT DOCUMENTS

| H1-158079 | 6/1989 | Japan . |
| H4-508 | 1/1992 | Japan . |
| H4-246483 | 9/1992 | Japan . |
| H7-258599 | 10/1995 | Japan . |

*Primary Examiner*—Kriellion Sanders

[57] ABSTRACT

The present invention provides a one-liquid low temperature hardenable type colored enamel paint and a one-liquid low temperature hardenable type clear paint, which are used for coating of plastic materials and sufficiently harden even by baking at a low temperature and can form a hardened coating film that is excellent in contaminationproofing and acid-proofing without damaging flexibility. The colored enamel paint comprises: resin components, which include a polyesterpolyol and an acrylic polyol; a crosslinking agent, which includes a blocked isocyanate as the essential component and may further include a melamine resin; a blocked isocyanate dissociation catalyst, which at least includes a dibutyltin dicarboxylate; and a pigment. The clear paint comprises: a resin component, which includes an acrylic polyol; the crosslinking agent; and the blocked isocyanate dissociation catalyst.

6 Claims, No Drawings

ONE-LIQUID LOW TEMPERATURE HARDENABLE TYPE COLORED ENAMEL PAINT AND CLEAR PAINT

BACKGROUND OF THE INVENTION

A. Technical Field

The present invention relates to respective improvements of a one-liquid low temperature hardenable type colored enamel paint and a one-liquid low temperature hardenable type clear paint, which are used for coating of car bumpers and so on, because the paints have excellent durability and waterproofing and further have softness. Colored enamel paint is mainly coated onto plastic materials such as bumpers, and the clear paint is mainly used for overcoating of a base coat layer, such as a coat layer of the colored enamel paint, as formed on a material surface.

B. Background Art

In recent years, there is a problem of acid rain as brought about by environmental contamination. Solution of this problem is especially important to cars running outdoors, and it is demanded that car paints as used for plastic materials of bumpers and so on and for steel sheets of bodies and so on all should be excellent in the acidproofing, and that coating films of the paints should not deteriorate even if acid rain adheres to their surfaces.

At present, the most commonly used car paints are those which harden by melamine-crosslinking. However, it is difficult to say that these paints have sufficient acidproofing, because the melamine resin decomposes by the action of an acid.

As to the car bumper paint, a coating film resultant therefrom needs to be soft for functions of bumpers, so the glass transition temperature of the coating film is usually set to be low. Thus, there are also problems in that when compared with the steel sheet paint, the bumper paint is easier to contaminate and more difficult to remove the contamination from. There is a possible method for improving the contaminationproofing of the bumper paint, in which the glass transition temperature of the coating film is enhanced to harden the coating film. However, such a method causes another problem in that the softness, namely, the flexibility, is so much decreased that the coating film cracks. Thus, as to the bumper paint, the contamination-proofing and the flexibility are mutually exclusive properties, and therefore it is desired to attain both properties.

Japanese Allowable Patent Publication (Kokoku) No. 4-508 discloses a coating composition, comprising an acrylic resin, a polyalkylene glycol resin, an amino resin, and a blocked isocyanate, as a paint that satisfies basic performance of bumper paints. This coating composition is assumed to be capable of forming a coating film that is excellent in properties such as weatherproofing and waterproofing and has good hardness due to the combination of the polyalkylene glycol resin with the acrylic resin. However, this coating composition is not sufficient with regard to the contaminationproofing or the acidproofing. In this case, the polyalkylene glycol resin, which acts as a softener and is included in the coating composition as an essential component thereof, is considered to decrease the contaminationproofing and the acidproofing.

Japanese Patent Application Publication (Kokai) No. 1-158079 discloses a coating composition, which comprises an acrylic copolymer and a melamine resin and may further comprise a blocked isocyanate, as a bumper paint. This paint is hardened by baking at a high temperature. For car usage, thus, a method, in which a paint is coated and then the resultant coating film is hardened by baking at a high temperature, is carried out, but where materials for bumpers are plastic materials, it is demanded to bake the coating film at a low temperature of about 120° C. because the plastic materials merely have low heatproofing. However, where the conventional paint as mentioned immediately above is baked at a low temperature, the hardening is insufficient, so that the contaminationproofing and the acidproofing are both low.

Although used for metals, a paint for metals of cars is disclosed in Japanese Patent Application Publication (Kokai) No. 4-246483. This paint comprises an organic tin monocarboxylate as a blocked isocyanate dissociation catalyst. In addition, Japanese Patent Application Publication (Kokai) No. 7-258599 discloses a steel sheet paint comprising an inorganic catalyst as a blocked isocyanate dissociation catalyst. As to this paint, the inorganic catalyst is insoluble in solvents, so this paint cannot be used as a clear paint for which transparency is demanded. Similarly to the above-mentioned conventional bumper paint, where baked at a low temperature, these steel sheet paints also merely insufficiently harden and therefore provide inferior results with regard to the contaminationproofing and the acidproofing.

Thus, none of the prior arts provides a paint that sufficiently hardens even by baking at a low temperature and secures the contaminationproofing and the acidproofing. From such circumstances, it is hoped to develop a car paint that sufficiently hardens by baking at a low temperature and is excellent in the contaminationproofing and the acidproofing.

SUMMARY OF THE INVENTION

A. Object of the Invention

An object of the present invention is to provide a one-liquid low temperature hardenable type colored enamel paint and a one-liquid low temperature hardenable type clear paint, which sufficiently harden even by baking at a low temperature and can form a hardened coating film that is excellent in the contaminationproofing and the acidproofing without damaging the flexibility.

B. Disclosure of the Invention

The present inventors made various experiments to solve the above-mentioned problems. As a result, the inventors attained the present invention by finding that physical properties of hardened coating films have a correlation with the flexibility, the contaminationproofing, and the acidproofing of the hardened coating films, and that the use of a blocked isocyanate dissociation catalyst having a specific structure makes it possible to sufficiently harden a paint even by baking at a low temperature.

Thus, a one-liquid low temperature hardenable type colored enamel paint, according to the present invention, comprises: resin components, which include a polyesterpolyol with a hydroxyl group value of 80 to 200 KOH mg/g and an acrylic polyol with a hydroxyl group value of 80 to 200 KOH mg/g; a crosslinking agent, which includes a blocked isocyanate as the essential component and may further include a melamine resin; a blocked isocyanate dissociation catalyst, which at least includes a dibutyltin dicarboxylate; and a pigment; wherein:

the ratio by weight between the polyesterpolyol and the acrylic polyol satisfies polyesterpolyol/acrylic polyol=60/40 to 30/70, and the ratio by weight between the blocked isocyanate and the melamine resin satisfies blocked isocyanate/melamine resin=100/0 to 60/40.

In addition, a one-liquid low temperature hardenable type clear paint, according to the present invention, comprises: a resin component, which includes an acrylic polyol with a hydroxyl group value of 60 to 200 KOH mg/g; a crosslinking agent, which includes a blocked isocyanate as the essential component and may further include a melamine resin; and a blocked isocyanate dissociation catalyst, which at least includes a dibutyltin dicarboxylate; wherein the ratio by weight between the blocked isocyanate and the melamine resin satisfies blocked isocyanate/melamine resin=100/0 to 30/70, and wherein a hardened coating film resultant from the paint has a glass transition temperature of 50 to 65° C.

These and other objects and the advantages of the present invention will be more fully apparent from the following detailed disclosure.

DETAILED DESCRIPTION OF THE INVENTION

The one-liquid low temperature hardenable type colored enamel paint of the present invention comprises resin components, a crosslinking agent, a blocked isocyanate dissociation catalyst, and a pigment.

In addition, the one-liquid low temperature hardenable type clear paint of the present invention comprises a resin component, a crosslinking agent, and a blocked isocyanate dissociation catalyst.

Hereinafter, each component of these paints is explained in detail.

[Resin Components]

The resin components as used in the present invention are main components for forming a coating film.

The resin components as used for the colored enamel paint comprise a polyesterpolyol with a hydroxyl group value of 80 to 200 KOH mg/g and an acrylic polyol with a hydroxyl group value of 80 to 200 KOH mg/g as the essential components.

In addition, the resin component as used for the clear paint comprises an acrylic polyol with a hydroxyl group value of 60 to 200 KOH mg/g as the essential component.

The polyesterpolyol as used for the colored enamel paint is not especially limited providing that its hydroxyl group value is in the range of 80 to 200 KOH mg/g. The polyesterpolyol is, for example, a copolymer comprising structural units as derived from monomers such as polyfunctional alcohols (a), polyfunctional carboxylic acids (b), or acid anhydrides of (b). The types of the structural units composing such a copolymer are not especially limited. The polyesterpolyol is excellent in softness and affords excellent flexibility to the paint.

Examples of polyfunctional alcohols (a) include ethylene glycol, neopentyl glycol, 1,6-hexane diglycol, and trimethylolpropane. Polyfunctional alcohols (a) may be used alone respectively or, if need arises, in combinations of two or more thereof.

Examples of polyfunctional carboxylic acids (b) include isophthalic acid, trimellitic acid, and adipic acid. Examples of the acid anhydrides of polyfunctional carboxylic acids (b) include phthalic anhydride and succinic anhydride. These may be used alone respectively or, if need arises, in combinations of two or more thereof. In addition, the polyesterpolyol may further comprise a structural unit as derived from monofunctional carboxylic acid (c) such as palmitic acid or stearic acid.

The polyesterpolyol can be obtained by copolymerizing monomers as fitly selected from polyfunctional alcohols (a), polyfunctional carboxylic acids (b), or acid anhydrides of (b) as mentioned above. In addition, the polyesterpolyol may be such as obtained by further copolymerizing monofunctional carboxylic acid (c).

The hydroxyl group value of the polyesterpolyol is in the range of 80 to 200 KOH mg/g, preferably, 90 to 160 KOH mg/g, more preferably, 100 to 150 KOH mg/g. Where the hydroxyl group value is less than 80 KOH mg/g, the acidproofing and the contaminationproofing are both insufficient. In addition, where the hydroxyl group value is more than 200 KOH mg/g, the flexibility might be deteriorated.

The acrylic polyol is substituted for the combination of the acrylic resin and the polyalkylene glycol resin as used in the above-mentioned prior art, and is excellent in softenability.

The acrylic polyol is not especially limited providing that its hydroxyl group value is in the range of 80 to 200 KOH mg/g in the use for the colored enamel paint and in the range of 60 to 200 KOH mg/g in the use for the clear paint.

The acrylic polyol is a polymer comprising an essential structural unit as derived from acrylic monomer (A) having a hydroxyl group, and may fitly be a copolymer further comprising a structural unit as derived from a monomer such as: acrylic monomer (B) having a carboxyl group; acrylic monomer (C) having an ester group, which is copolymerizable with acrylic monomers (A) and (B); or vinylic monomer (D) other than the acrylic monomers. Thus, the types of the structural units composing the polymer are not especially limited.

Examples of acrylic monomer (A) having a hydroxyl group include 2-hydroxyethyl (meth)acrylate, 3-hydroxypropyl (meth)acrylate, 4-hydroxybutyl (meth)acrylate, and ε-caprolactam adducts thereof. Acrylic monomers (A) may be used alone respectively or, if need arises, in combinations of two or more thereof.

Examples of acrylic monomer (B) having a carboxyl group include (meth)acrylic acid. Acrylic monomers (B) may be used alone respectively or, if need arises, in combinations of two or more thereof.

Examples of acrylic monomer (C) having an ester group include methyl (meth)acrylate, ethyl (meth)acrylate, butyl (meth)acrylate, isobutyl (meth)acrylate, and lauryl (meth) acrylate. Acrylic monomers (C) may be used alone respectively or, if need arises, in combinations of two or more thereof.

Examples of vinylic monomer (D) include styrene. Vinylic monomers (D) may be used alone respectively or, if need arises, in combinations of two or more thereof.

The acrylic polyol can be obtained by polymerizing a monomer as fitly selected from acrylic monomers (A) to (C) and vinylic monomers (D) as mentioned above.

The hydroxyl group value of the acrylic polyol as used for the colored enamel paint is in the range of 80 to 200 KOH mg/g, preferably, 90 to 160 KOH mg/g, more preferably, 100 to 150 KOH mg/g. Where the hydroxyl group value is less than 80 KOH mg/g, the acidproofing and the contaminationproofing are both insufficient. In addition, where the hydroxyl group value is more than 200 KOH mg/g, the flexibility might be deteriorated.

In addition, the hydroxyl group value of the acrylic polyol as used for the clear paint is in the range of 60 to 200 KOH mg/g, preferably, 70 to 160 KOH mg/g. Where the hydroxyl group value is less than 60 KOH mg/g, the acidproofing and the contaminationproofing are both insufficient. In addition, where the hydroxyl group value is more than 200 KOH mg/g, the flexibility might be deteriorated.

In the colored enamel paint, the ratio by weight between the polyesterpolyol and the acrylic polyol, which are combined as the resin components, is in the range of polyesterpolyol/acrylic polyol=60/40 to 30/70, preferably, 50/50 to 40/60. Where the ratio by weight of the polyesterpolyol is more than the above-mentioned ranges, the acidproofing and the contaminationproofing are both deteriorated. On the other hand, where the ratio by weight of the polyesterpolyol is less than the above-mentioned ranges, the flexibility is unfavorably deteriorated.

[Crosslinking Agent]

The crosslinking agent as used in the present invention comprises a blocked isocyanate as the essential component and may further comprise a melamine resin. The crosslinking agent properly adjusts the hardness and the strength of a coating film.

Examples of the blocked isocyanate include blocked products as obtained by reacting non-yellowing type polyisocyanates, such as hexamethylene diisocyanate and isophorone diisocyanate, with blocking agents such as acetone oxime, methyl ethyl ketone oxime, ethyl acetoacetate, and acetylacetone. The blocked isocyanates may be used alone respectively or, if need arises, in combinations of two or more thereof. Among the blocked isocyanates, at least one of respective blocked products of hexamethylene diisocyanate and isophorone diisocyanate is preferable, because these blocked products provide excellent results with regard to the weatherproofing.

However, as to the crosslinking agent, the use of blocked products of aromatic isocyanates such as tolylene diisocyanate is unfavorable, because the blocked products of the aromatic isocyanates yellow the paints. Especially, as to the clear paint, because the transparency is demanded thereto, the use of the blocked products of the aromatic isocyanates is unfavorable.

Examples of the melamine resin include alkyl etherated melamines such as methyl etherated melamine, ethyl etherated melamine, and butyl etherated melamine. The melamine resins may be used alone respectively or, if need arises, in combinations of two or more thereof.

In the colored enamel paint, the ratio by weight between the blocked isocyanate and the melamine resin, which are combined as the crosslinking agent, is in the range of blocked isocyanate/melamine resin=100/0 to 60/40, preferably, 75/25 to 65/35. Where the above-mentioned ratio by weight is less than 60/40, the ratio of the melamine resin in the entirety of the crosslinking agent is so large that the acidproofing and the contaminationproofing are unfavorably deteriorated.

In the clear paint, the ratio by weight between the blocked isocyanate and the melamine resin, which are combined as the crosslinking agent, is in the range of blocked isocyanate/melamine resin=100/0 to 30/70, preferably, 50/50 to 30/70. Where the above-mentioned ratio by weight is less than 30/70, the ratio of the melamine resin in the entirety of the crosslinking agent is so large that the acidproofing and the contaminationproofing are unfavorably deteriorated.

The ratio of the combination of the crosslinking agent in the colored enamel paint and in the clear paint is not especially limited, but the ratio is, for example, preferably in the range of 20 to 40 parts by weight, more preferably, 25 to 35 parts by weight, per 100 parts by weight of the resin components. Where the ratio of the combination of the crosslinking agent is too small, the paint does not sufficiently harden, and provides inferior results with regard to the acidproofing and the contaminationproofing. On the other hand, where the ratio is too large, the flexibility might be deteriorated.

The crosslinking agent may further comprise chemicals, such as benzoguanamine, other than the blocked isocyanate and the melamine resin.

[Blocked Isocyanate Dissociation Catalyst]

Because the crosslinking agent as used in the present invention comprises a blocked isocyanate as the essential component, the colored enamel paint and the clear paint both contain a blocked isocyanate dissociation catalyst which at least includes a dibutyltin dicarboxylate.

Examples of the dibutyltin dicarboxylate include bis (dibutyltin) maleate and bis(dibutyltin) fumarate. The dibutyltin dicarboxylates may be used alone respectively or, if need arises, in combinations of two or more thereof. The use of this dissociation catalyst makes it possible to bake respective coating films of the colored enamel paint and the clear paint in the low temperature range, for example, of 110 to 120° C. and improves the compatibility with the resin components and therefore provides the baked coating films with a good appearance.

The ratio of the combination of the blocked isocyanate dissociation catalyst in the colored enamel paint and in the clear paint is not especially limited, but the ratio is, for example, preferably in the range of 1 to 3 parts by weight per 100 parts by weight of the resin components. Where the ratio of the combination of the blocked isocyanate dissociation catalyst is too small, the paint does not sufficiently harden, and provides inferior results with regard to the acidproofing and the contaminationproofing. On the other hand, the ratio is too large, the appearance property might be deteriorated.

[Pigment]

Because the colored enamel paint of the present invention aims at coloring, it contains a pigment. Examples of the pigment include: inorganic pigments such as titanium dioxide; organic pigments such as phthalocyanine blue; brilliant pigments such as aluminum foil; extenders such as talc. The pigments may be used alone respectively or, if need arises, in combinations of two or more thereof.

The ratio of the combination of the pigment in the colored enamel paint is not especially limited, but the ratio is, for example, preferably in the range of 3 to 100 parts by weight, more preferably, 5 to 80 parts by weight, per 100 parts by weight of the resin components.

[Other Components]

If need arises, the colored enamel paint and the clear paint can further comprise additives such as melamine resinhardening catalysts (e.g. paratolunesulfonic acid and dodecylbenzenesulfonic acid), ultraviolet absorbents (e.g. benzotriazole), and surface conditioners. The ratio of the combination of these additives in the paint is not especially limited and can fitly be selected.

[One-liquid Low Temperature Hardenable Type Colored Enamel Paint]

The one-liquid low temperature hardenable type colored enamel paint is obtained by mixing together the resin components, the crosslinking agent, the blocked isocyanate dissociation catalyst, and the pigment as explained above in detail. The paint may be a mixture as obtained by further mixing other components.

A hardened coating film resultant from the one-liquid low temperature hardenable type colored enamel paint preferably has a glass transition temperature of 50 to 65° C. Where the glass transition temperature of the hardened coating film is lower than 50° C., the acidproofing and the contaminationproofing might be both insufficient. On the other hand, where the glass transition temperature is higher than 65° C., cracking might unfavorably occur to the coating film, and the flexibility might unfavorably be deteriorated.

The one-liquid low temperature hardenable type colored enamel paint is, for example, used for coating of surfaces of plastic materials such as car bumpers. Although not especially limited, examples of methods for coating this paint include spray coating. In addition, before used, this paint may be diluted, for example, with solvents.

The one-liquid low temperature hardenable type colored enamel paint is used for coating of surfaces of plastic materials, and a coating film as formed by coating this paint can be hardened by baking the film. The baking temperature is usually a low temperature of 110 to 120° C., and even at such a low temperature the coating film can sufficiently be hardened.

[One-liquid Low Temperature Hardenable Type Clear Paint]

The one-liquid low temperature hardenable type clear paint is obtained by mixing together the resin component, the crosslinking agent, and the blocked isocyanate dissociation catalyst as explained above in detail. The paint may be a mixture as obtained by further mixing other components.

A hardened coating film resultant from the one-liquid low temperature hardenable type clear paint has a glass transition temperature of 50 to 65° C. Where the glass transition temperature of the hardened coating film is lower than 50° C., the acidproofing and the contaminationproofing are both insufficient. On the other hand, where the glass transition temperature is higher than 65° C., cracking unfavorably occurs to the coating film, and the flexibility is unfavorably deteriorated.

The one-liquid low temperature hardenable type clear paint is usually used for overcoating a base coat layer in a wet-on-wet manner. A method for overcoating the clear paint is not especially limited. Before used, the clear paint may be diluted, for example, with solvents. The above-mentioned base coat layer is formed by coating a surface of a substrate with a base paint.

After overcoating with the clear paint, the coating film can be hardened by baking the overcoat surface. The baking temperature is preferably a low temperature, for example, of 110 to 120° C., because: at such a low temperature, the coating film can sufficiently be hardened, the working efficiency is high, and in the case of plastic materials, their heatproofing is not damaged.

(Effects and Advantages of the Invention)

The one-liquid low temperature hardenable type colored enamel paint and the one-liquid low temperature hardenable type clear paint, according to the present invention, sufficiently harden even by baking at a low temperature and can form a hardened coating film that is excellent in the contaminationproofing and the acidproofing without damaging the flexibility while the hardened coating film is excellent in the weatherproofing and the waterproofing and has adhesion to plastic materials or to base coat layers and further has softness. Therefore, the one-liquid low temperature hardenable type colored enamel paint and the one-liquid low temperature hardenable type clear paint, according to the present invention, are both especially excellent for the use of coating, for example, of car bumpers.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples. First, polyesterpolyols a to d were produced in Production Examples 1 to 2 and Comparative Production Examples 1 to 2, and acrylic polyols A to H were produced in Production Examples 3 to 6 and Comparative Production Examples 3 to 6. Hereinafter, "parts" denotes "parts by weight."

PRODUCTION EXAMPLES 1 TO 2 AND COMPARATIVE PRODUCTION EXAMPLES 1 TO 2

Copolymerizable components and xylene as shown in Table 1 were charged into a flask as equipped with a stirrer, a temperature controller, and a dehydrator with a condenser. The mixture in the flask were heated under stirring conditions to elevate the temperature to 230° C. spending 2 hours to carry out an esterification reaction for 7 hours. After the reaction had finished, the reaction mixture was cooled to 100° C., and then butyl acetate was added to the mixture, and then the resultant mixture was cooled to room temperature, thus producing polyesterpolyols a to d having hydroxyl group values as shown in Table 1. In addition, Table 1 shows the amount of the dehydration of water, which formed in the reaction, and the yield.

TABLE 1

|  |  | Production Example | | Comparative Production Example | |
|---|---|---|---|---|---|
| Polyesterpolyol |  | 1 b | 2 c | 1 a | 2 d |
| Copolymerizable components | 1,6-Hexanediol (parts) | 33.8 | 35 | 31.4 | 38 |
|  | Trimethylolpropanediol | 9.6 | 10 | 9.0 | 11 |
|  | Adipic acid | 9.6 | 10 | 12.3 | 11 |
|  | Phthalic anhydride | 13 | 10 | 12.3 | 11 |
|  | Isophthalic acid | 23.5 | 24 | 25.0 | 17.5 |
| Xylene (parts) |  | 5 | 5 | 5 | 5 |
| Butyl acetate |  | 15 | 15 | 15 | 15 |
| Amount of dehydration (parts) |  | 9.5 | 9.0 | 10.0 | 8.5 |
| Yield (%) |  | 100 | 100 | 100 | 100 |
| Hydroxyl group value (KOH mg/g) |  | 100 | 150 | 50 | 210 |

PRODUCTION EXAMPLES 3 TO 6 AND COMPARATIVE PRODUCTION EXAMPLES 3 TO 6

One hundred parts of Solvesso #100 (solvent naphtha, made by EXXON Chemical Co.) was charged as a solvent into a flask as equipped with a stirrer, a temperature controller, and a condenser. The solvent in the flask was heated under stirring conditions to elevate the solvent temperature to 100° C. Then, copolymerizable components (total 101 parts) as shown in Tables 2 and 3 were dropwise added respectively into the flask over a period of 2 hours, and then the temperature of the reaction mixture was maintained at 100° C. to carry out a polymerization reaction for 4 hours, thus producing acrylic polyols A to H having hydroxyl group values as shown in Tables 2 and 3.

TABLE 2

|  |  | Production Example | | Comparative Production Example | |
|---|---|---|---|---|---|
| Acrylic polyol |  | 3 B | 4 C | 3 A | 4 D |
| Copolymerizable components (parts) | Styrene | 30 | 10 | 10 | 10 |
|  | Methyl methacrylate | 33 | — | 44.5 | — |
|  | Ethyl acrylate | — | 30 | 45 | 30 |
|  | Butyl acrylate | 13 | — | 33 | — |
|  | Isobutyl methacrylate | — | 25 | — | 11 |
|  | 2-Hydroxyethyl methacrylate | 23 | 34 | 11.5 | 48 |
|  | Methacrylic acid | 1 | 1 | 1 | 1 |
|  | Kayaester O *1 | 1 | 1 | 1 | 1 |
| Hydroxyl group value (KOH mg/g) |  | 100 | 150 | 50 | 210 |

*1: Made by NIPPON KAYAKU Co., Ltd.

TABLE 3

|  |  | Production Example | | Comparative Production Example | |
|---|---|---|---|---|---|
| Acrylic polyol |  | 5 F | 6 G | 5 E | 6 H |
| Copolymerizable components (parts) | Sytrene | 10 | 10 | 10 | 10 |
| | Isobutyl methacrylate | — | 25 | 43 | 11 |
| | Ethyl acrylate | 45 | 30 | — | 30 |
| | Butyl acrylate | — | — | 20 | — |
| | Lauryl methacrylate | 28 | — | — | — |
| | 2-Hydroxyethyl methacrylate | 16 | 34 | 6 | 48 |
| | Placcel FM-3 *1 | — | — | 20 | — |
| | Methacrylic acid | 1 | 1 | 1 | 1 |
| | Kayaester O *2 | 1 | 1 | 1 | 1 |
| Hydroxyl group value (KOH mg/g) |  | 79 | 150 | 50 | 210 |

*1: Made by DAICEL Chem. Ind.
*2: Made by NIPPON KAYAKU Co., Ltd.

EXAMPLES 1 TO 5 AND COMPARATIVE EXAMPLES 1 TO 8

Colored enamel paints 1 to 5 and comparative colored enamel paints 1 to 8 were produced by mixing components, as shown in Tables 4 and 5, with titanium dioxide as prepared such that the amount thereof would be 66.67 parts per 100 parts of the resin components. The resultant (comparative) colored enamel paints were evaluated in the following way:

The surface of a polypropylene material for bumpers was wipe-washed with tap water and then coated with a primer (RB195-1, made by Nippon Bee Chemical Co., Ltd.) in a thickness of 10 μm. The resultant coating film was baked at 120° C. for 5 minutes. Next, the baked coating film of the primer was coated with each of the above-produced (comparative) colored enamel paints in a thickness of 30 μm, and then the resultant coating films were hardened by baking at 120° C. for 20 minutes. Properties of the hardened coating films as obtained were evaluated by the following methods:

<Evaluation Methods>:

1. Glass Transition Temperature (Tg) of the Hardened Coating Films:

The glass transition temperature was measured using Rheospectler 9002-DVE (made by Rheology Co., Ltd.).

2. Acidproofing:

Artificial acid rain was dropped onto the surfaces of the hardened coating films, and then the films were left in a gradient oven (made by BYK Co., Ltd.) at 70° C. for 30 minutes. After washing with water, the surface roughness was measured with a surface roughness meter (Surfcom, made by Tokyo Seimitsu Co., Ltd.), and an etching depth of 0.5 μm or less was judged "o", and an etching depth of more than 0.5 μm was judged "X."

3. Contaminationproof:

The hardened coating films were exposed outdoors for 6 months, and then stains that adhered to the films were wiped off with tap water. A hardened coating film from which the stain could be washed off was judged "o," and a hardened coating film on which the stain remained was judged "X."

4. Flexibility:

The hardened coating films were left at 20° C. for one night and then bent to an angle of 90°. As a result, a hardened coating film to which no crack occurred was judged "o," and a hardened coating film to which cracks occurred was judged "X."

EXAMPLES 6 TO 8 AND COMPARATIVE EXAMPLES 9 TO 13

Clear paints 1 to 3 and comparative clear paints 1 to 5 were produced by mixing components as shown in Table 6. The resultant (comparative) clear paints were evaluated in the following way:

The surface of a polypropylene material for bumpers was wipe-washed with tap water and then coated with a primer (RB195-1, made by Nippon Bee Chemical Co., Ltd.) in a thickness of 10 μm. The resultant coating film was baked at 120° C. for 5 minutes. Next, the surface of the baked primer was coated with a base paint (R-331, made by Nippon Bee Chemical Co., Ltd.) in a thickness of 15 μm, thus forming a base coat layer. This base coat layer was coated with each of the above-produced (comparative) clear paints in a thickness of 25 μm in a wet-on-wet manner, and then the resultant coating films were hardened by baking at 120° C. for 20 minutes. Properties of the hardened coating films as obtained were evaluated by the above-mentioned methods:

TABLE 4

| | (unit: parts) | Example 1 | 2 | 3 | 4 | 5 |
|---|---|---|---|---|---|---|
| Resin component | Polyesterpolyol a (OHV = 50) | — | — | — | — | — |
| | Polyesterpolyol b (OHV = 100) | 22 | — | — | — | 16.5 |
| | Polyesterpolyol c (OHV = 150) | — | 22 | 22 | 30 | — |
| | Polyesterpolyol d (OHV = 210) | — | — | — | — | — |
| | Acrylic polyol A (OHV = 50) | — | — | — | — | — |
| | Acrylic polyol B (OHV = 100) | 33 | — | — | — | 38.5 |
| | Acrylic polyol C (OHV = 150) | — | 33 | 33 | 25 | — |
| | Acrylic polyol D (OHV = 210) | — | — | — | — | — |
| Crosslinking agent | Melamine resin *1 | — | 10 | 16 | — | — |
| | HMDI blocked isocyanate *2 | 40 | 30 | 24 | — | 40 |
| | IPDI blocked isocyanate *3 | — | — | — | 40 | — |
| Blocked isocyanate dissociation catalyst *4 | | 1.5 | 1.5 | 1.5 | 1.5 | 1.5 |
| Ratio by weight of polyesterpolyol/acrylic polyol | | 40/60 | 40/60 | 40/60 | 54.5/45.5 | 30/70 |
| Ratio by weight of blocked isocyanate/melamine resin | | 100/0 | 75/25 | 60/40 | 100/0 | 100/0 |
| Tg (° C.) of hardened coating film | | 52 | 61 | 64 | 60 | 59 |
| Acidproof | | o | o | o | o | o |

TABLE 4-continued

|  | Example | | | | |
|---|---|---|---|---|---|
| (unit: parts) | 1 | 2 | 3 | 4 | 5 |
| Contaminationproof | ○ | ○ | ○ | ○ | ○ |
| Flexibility | ○ | ○ | ○ | ○ | ○ |

TABLE 5

|  | Comparative Example | | | | | | | |
|---|---|---|---|---|---|---|---|---|
| (unit: parts) | 1 | 2 | 3 | 4 | 5 | 6 | 7 | 8 |
| Resin component | | | | | | | | |
| Polyesterpolyol a (OHV = 50) | 22 | — | — | — | — | 30 | — | — |
| Polyesterpolyol b (OHV = 100) | — | — | 38.5 | 11 | 22 | — | — | — |
| Polyesterpolyol c (OHV = 150) | — | — | — | — | — | — | 22 | 22 |
| Polyesterpolyol d (OHV = 210) | — | 22 | — | — | — | — | — | — |
| Acrylic polyol A (OHV = 50) | 33 | — | — | — | — | — | — | — |
| Acrylic polyol B (OHV = 100) | — | — | 16.5 | 44 | 33 | 25 | — | — |
| Acrylic polyol C (OHV = 150) | — | — | — | — | — | — | — | 33 |
| Acrylic polyol D (OHV = 210) | — | 33 | — | — | — | — | 33 | — |
| Crosslinking agent | | | | | | | | |
| Melamine resin *1 | — | — | — | — | 28 | 16 | — | 16 |
| HMDI blocked isocyanate *2 | 40 | — | 40 | 40 | 12 | 24 | — | 24 |
| IPDI blocked isocyanate *3 | — | 40 | — | — | — | — | 40 | — |
| Blocked isocyanate dissociation catalyst *4 | 1.5 | 1.5 | 1.5 | 1.5 | 1.5 | 1.5 | 1.5 | — |
| Ratio by weight of polyesterpolyol/acrylic polyol | 40/60 | 40/60 | 70/30 | 20/80 | 40/60 | 54.5/45.5 | 40/60 | 40/60 |
| Ratio by weight of blocked isocyanate/melamine resin | 100/0 | 100/0 | 100/0 | 100/0 | 30/70 | 60/40 | 100/0 | 60/40 |
| Tg (° C.) of hardened coating film | 47 | 70 | 42 | 68 | 55 | 47 | 69 | 38 |
| Acidproof | X | X | X | ○ | X | X | ○ | X |
| Contaminationproof | X | ○ | X | ○ | ○ | X | ○ | X |
| Flexibility | ○ | X | ○ | X | ○ | ○ | X | ○ |

TABLE 6

|  | Example | | | Comparative Example | | | | |
|---|---|---|---|---|---|---|---|---|
| (unit: parts) | 6 | 7 | 8 | 9 | 10 | 11 | 12 | 13 |
| Resin component | | | | | | | | |
| Acrylic polyol E (OHV = 50) | — | — | — | 70 | — | — | — | — |
| Acrylic polyol F (OHV = 70) | 66 | — | 66 | — | — | 70 | 66 | 66 |
| Acrylic polyol G (OHV = 150) | — | 66 | — | — | — | — | — | — |
| Acrylic polyol H (OHV = 210) | — | — | — | — | 66 | — | — | — |
| Crosslinking agent | | | | | | | | |
| Melamine resin *1 | 22 | 22 | 12 | 18 | 22 | 18 | 17 | 22 |
| HMDI blocked isocyanate *2 | — | 12 | 22 | — | — | 12 | — | — |
| IPDI blocked isocyanate *3 | 12 | — | — | 12 | 12 | — | 17 | 12 |
| Blocked isocyanate dissociation catalyst *4 | 2 | 2 | 2 | 2 | 2 | 2 | 2 | — |
| Ratio by weight of blocked isocyanate/melamine resin | 35/65 | 35/65 | 65/35 | 40/60 | 35/65 | 40/60 | 50/50 | 35/65 |
| Tg (° C.) of hardened coating film | 63 | 65 | 57 | 55 | 63 | 47 | 67 | 42 |
| Acidproof | ○ | ○ | ○ | X | X | X | ○ | X |
| Contaminationproof | ○ | ○ | ○ | X | ○ | X | ○ | X |
| Flexibility | ○ | ○ | ○ | ○ | X | ○ | X | ○ |

*1: Isobutylated melamine (Uvan 165, made by Mitsui Toatsu Chemical Industries Kabushiki kaisha).
*2: Methyl ethyl ketone oxime-blocked hexamethylene diisocyanate trimer.
*3: Methyl ethyl ketone oxime-blocked iosphorone diisocyanate.
*4: Bis(dibutyltin) maleate.

<Results of Evaluation>:
(Colored Enamel Paint):
As to any of Examples 1 to 5, the hardened coating film has Tg in the range of 50 to 65° C. and is excellent with regard to the acidproofing, the contaminationproofing and the flexibility. In contrast therewith, as to Comparative Example 1, because the polyesterpolyol and the acrylic polyol, both of which have a hydroxyl group value of less than 80 KOH mg/g, are used, the acidproofing and the contaminationproofing are inferior. As to Comparative Example 2, because the polyesterpolyol and the acrylic polyol, both of which have a hydroxyl group value of more than 200 KOH mg/g, are used, the acidproofing and the flexibility are inferior. As to Comparative Example 3, because the ratio by weight of the polyesterpolyol is high, the acidproofing and the contaminationproofing are inferior. As to Comparative Example 4, because the ratio by weight of the polyesterpolyol is low, the flexibility is inferior. As to Comparative Example 5, because the ratio by weight of the melamine resin is high, the acidproofing is inferior. As to Comparative Example 6, because the polyesterpolyol having a hydroxyl group value of less than 80 KOH mg/g is used, the acidproofing and the contaminationproofing are inferior. As to Comparative Example 7, because the acrylic polyol having a hydroxyl group value of more than 200 KOH mg/g is used, the flexibility is inferior. As to Comparative Example 8, because no blocked isocyanate dissociation catalyst is used, the hardening is not sufficient, and the acidproofing and the contaminationproofing are inferior.

(Clear Paint):

As to any of Examples 6 to 8, the hardened coating film has Tg in the range of 50 to 65° C. and is excellent with regard to the acidproofing, the contaminationproofing and the flexibility. In contrast therewith, as to Comparative Example 9, because the acrylic polyol having a hydroxyl group value of less than 60 KOH mg/g is used, the acidproofing and the contaminationproofing are inferior. As to Comparative Example 10, because the acrylic polyol having a hydroxyl group value of more than 200 KOH mg/g is used, the flexibility is inferior. As to Comparative Example 11, because Tg is lower than 50° C., the acidproofing and the contaminationproofing are inferior. As to Comparative Example 12, because Tg is higher than 65 ° C., the flexibility is inferior. As to Comparative Example 13, because no blocked isocyanate dissociation catalyst is used, the hardening is not sufficient, and the acidproofing and the contaminationproofing are inferior.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A one-liquid low temperature hardenable type colored enamel paint, comprising: resin components, which include a polyesterpolyol with a hydroxyl group value of 80 to 200 KOH mg/g and an acrylic polyol with a hydroxyl group value of 80 to 200 KOH mg/g; a crosslinking agent, which includes a blocked isocyanate as the essential component and may further include a melamine resin; a blocked isocyanate dissociation catalyst, which at least includes a dibutyltin dicarboxylate; and a pigment; wherein:

the ratio by weight between the polyesterpolyol and the acrylic polyol satisfies polyesterpolyol/acrylic polyol= 60/40 to 30/70, and the ratio by weight between the blocked isocyanate and the melamine resin satisfies blocked isocyanate/melamine resin=100/0 to 60/40.

2. A one-liquid low temperature hardenable type colored enamel paint according to claim 1, wherein a hardened coating film resultant from the paint has a glass transition temperature of 50 to 65° C.

3. A one-liquid low temperature hardenable type colored enamel paint according to claim 1, wherein the blocked isocyanate is either or both of respective blocked products of hexamethylene diisocyanate and isophorone diisocyanate.

4. A one-liquid low temperature hardenable type colored enamel paint according to claim 2, wherein the blocked isocyanate is either or both of respective blocked products of hexamethylene diisocyanate and isophorone diisocyanate.

5. A one-liquid low temperature hardenable type clear paint, comprising: a resin component, which includes an acrylic polyol with a hydroxyl group value of 60 to 200 KOH mg/g; a crosslinking agent, which includes a blocked isocyanate as the essential component and may further include a melamine resin; and a blocked isocyanate dissociation catalyst, which at least includes a dibutyltin dicarboxylate; wherein the ratio by weight between the blocked isocyanate and the melamine resin satisfies blocked isocyanate/melamine resin=100/0 to 30/70, and wherein a hardened coating film resultant from the paint has a glass transition temperature of 50 to 65° C.

6. A one-liquid low temperature hardenable type clear paint according to claim 5, wherein the blocked isocyanate is either or both of respective blocked products of hexamethylene diisocyanate and isophorone diisocyanate.

* * * * *